United States Patent
Brownell

(10) Patent No.: US 8,538,832 B2
(45) Date of Patent: Sep. 17, 2013

(54) METHOD AND SYSTEM FOR CUSTOMIZATION BY SALE OF COMPONENT PARTS AND ACCESSORIES

(76) Inventor: Peter R. Brownell, Grinnell, IA (US)

( * ) Notice: Subject to any disclaimer, the term of this patent is extended or adjusted under 35 U.S.C. 154(b) by 568 days.

(21) Appl. No.: 12/465,220

(22) Filed: May 13, 2009

(65) Prior Publication Data
US 2010/0293071 A1    Nov. 18, 2010

(51) Int. Cl.
*G06Q 30/00* (2012.01)
(52) U.S. Cl.
USPC ........................................ 705/26.5
(58) Field of Classification Search
USPC ............... 705/26.1, 26.2, 26.25, 26.3, 26.35, 705/26.4, 26.41–26.44, 26.5, 26.61–26.64, 705/26.7, 26.8, 26.81, 26.82, 26.9, 27.1, 705/27.2
See application file for complete search history.

(56) References Cited

U.S. PATENT DOCUMENTS

| | | | | |
|---|---|---|---|---|
| 6,035,305 A | * | 3/2000 | Strevey et al. .................... | 1/1 |
| 6,083,267 A | * | 7/2000 | Motomiya et al. ............. | 703/6 |
| 6,167,383 A | * | 12/2000 | Henson ........................... | 705/26 |
| 6,637,142 B1 | * | 10/2003 | Reynolds ...................... | 42/75.03 |
| 7,437,319 B2 | * | 10/2008 | Brownell ....................... | 705/27 |
| 8,225,542 B2 | * | 7/2012 | Houde-Walter ................. | 42/72 |
| 2002/0156698 A1 | * | 10/2002 | Machau et al. ................ | 705/26 |
| 2003/0035061 A1 | * | 2/2003 | Iwaki et al. .................... | 348/371 |

FOREIGN PATENT DOCUMENTS

WO    WO 03/021393    *    3/2003

OTHER PUBLICATIONS

J. P. Bishop, "Visual Configurator System for Configuring and Ordering IBM Products", IBM Technical Disclosure Bullentin, vol. 34, No. 12, May 1992.*

* cited by examiner

*Primary Examiner* — Naeem Haq
(74) *Attorney, Agent, or Firm* — McKee, Voorhees & Sease, P.L.C.

(57) ABSTRACT

A method for selling component parts to a customer over a communications network includes providing a plurality of component part selections over the communications network, the component part selections being from a plurality of different manufacturers. The method further includes receiving a selection of a first component part over the communications network, sending a first image for display to the customer, the first image being of the first component part, receiving a selection of a second component part. The method further includes sending a second image for display to the customer, the second image being of the second component part, such that the second image being displayed in a position proximate the first image and registered relative to the first image to visually depict an assembly having both the first component part and the second component part.

13 Claims, 9 Drawing Sheets

METHOD AND SYSTEM FOR CUSTOMIZATION BY SALE OF COMPONENT PARTS AND ACCESSORIES

FIELD OF THE INVENTION

The present invention relates to electronic commerce. More particularly, but not exclusively, the present invention relates to providing a method and system for selling component parts and accessories.

BACKGROUND OF THE INVENTION

To assist in providing background of the invention, various problems are discussed in the context of fire arms. The present invention, however, has applicability beyond fire arms and thus this background is intended to be representative and not limiting.

One type of popular fire arm is an AR-15. The AR-15 in its civilian version is a semi-automatic rifle. The AR-15 has been available for decades in the U.S. and is hugely popular. The AR-15, due in part to its popularity, has become highly configurable or customizable. Thus, an AR-15 owner may outfit their gun with such accessories as bayonet lugs, collapsing butt stocks, threaded barrels for the attachment of other accessories, numerous types of sights, and other accessories. An AR-15 owner may configure or customize their AR-15 for practical reasons or as an expression of their identity and individuality.

Yet an AR-15 owner faces various problems and constraints when customizing their fire arm. It can be difficult for an AR-15 owner to determine which combination of component parts and accessories is appropriate for them.

AR-15 owners may seek out gun stores to provide expertise regarding customization options. At a gun store an AR-15 owner may learn more about what types of components are available for customizing their AR-15. At the gun store, an AR-15 owner may even be able to try out different component parts with their AR-15 to determine if the component parts or accessories give them the look and/or function that they desire. However, a gun store is likely to have a relatively limited inventory of available component parts, thus an AR-15 owner would be limited with respect to the options they could try out.

Alternatively, AR-15 owners could purchase component parts and accessories through catalogs or online. Yet, there are problems in doing so. First, the AR-15 owner may not feel comfortable with installation or assembly of the component parts or accessories without guidance from someone at a gun store. Second, the AR-15 owner may not be confident that the component parts and accessories they are ordering will be compatible with their existing gun or components. Third, an AR-15 owner who is seeking a particular look and/or function for their AR-15 may find it difficult to envision what their AR-15 would look like with particular components or accessories.

For all these reasons, it can be difficult or inconvenient for an AR-15 owner to find and purchase component parts and accessories which meet their needs. Although discussed in the context of the AR-15, these types of problems are not necessarily specific to AR-15s, not necessarily specific to firearms, and not necessarily specific to sporting goods. At least some of these same problems are present in a wide variety of goods, and particularly of items which have component parts or accessories from different manufactures and which are not assembled at a factory.

BRIEF SUMMARY OF THE INVENTION

Therefore it is a primary object, feature, or advantage of the present invention to improve over the state of the art.

It is a further object, feature, or advantage of the present invention to provide a method and system for selling component parts and accessories which assists a customer by visually depicting the component parts and accessories together, even when the different component parts and accessories come from different manufacturers.

Another object, feature, or advantage of the present invention is to provide educational resources for customers to assist them in assembling component parts and accessories.

Yet another object, feature, or advantage of the present invention is to provide a method and system that allows for visually depicting component parts a customer already has in combination with component parts which they are considering purchasing.

A still further object, feature, or advantage of the present invention is to provide a method and system which allow a store owner to assist their customers in selecting different component parts to purchase without keeping all the component parts in inventory.

Another object, or advantage of the present invention is to provide a customer with a list of components for immediate or future acquisition.

One or more of these and/or other objects, features, or advantages of the present invention will become apparent from the specification and claims. It is not intended that the invention be limited to or by any of these objects, features, or advantages. Moreover, no single embodiment need exhibit all or any of these objects, features, or advantages.

According to one aspect of the present invention, a method for selling component parts to a customer over a communications network is provided. The method includes providing a plurality of component part selections over the communications network, the component part selections being from a plurality of different manufacturers. The method further includes receiving a selection of a first component part over the communications network. The method further includes sending a first image for display to the customer, the first image being of the first component part. The method further includes receiving a selection of a second component part. The method further includes sending a second image for display to the customer, the second image being of the second component part, such that the second image being displayed in a position proximate the first image and registered relative to the first image to visually depict an assembly having both the first component part and the second component part. The method may also provide for receiving an order for at least one of the first component part and the second component part.

According to another aspect of the present invention, a system for assisting with selling component parts to a customer over a communications network is provided. The system includes a plurality of images of component parts stored on a first computer readable medium. The system further includes an article of software stored on a second computer readable medium to provide for (a) receiving component part selections from a customer, (b) for each of the component part selections displaying one of the plurality of images of component parts, such that each of the images being proximate and registered relative to other of the images to thereby visually depict an assembly having all of the component part selections, and (c) generating an order for one or more of the component parts. The system further includes a computer operatively connected to the communications network and adapted to access the first computer readable medium and the second computer readable medium.

According to another aspect of the present invention, a method for selling firearm component parts to a customer over the internet is provided. The method includes providing a plurality of firearm component part selections over the internet, the component part selections being from a plurality of different manufacturers. The method further includes receiving a selection of a first firearm component part over the internet, sending a first image for display to the customer, the first image being of the first firearm component part, and receiving a selection of a second firearm component part. The method further includes sending a second image for display to the customer over the internet, the second image being of the second firearm component part, such that the second image being displayed in a position proximate the first image and registered relative to the first image to visually depict an assembly having both the first component part and the second component part. The method further includes receiving an order for at least one of the first firearm component part and the second firearm component part.

DETAILED DESCRIPTION OF THE PREFERRED EMBODIMENT

The present invention relates to methods and systems associated with providing a user with a visual depiction of an assembly of component parts or accessories. Although a embodiment is described illustrating the building of an AR-15 as an example of a gun, and as a further example of a sporting good, the present invention contemplates that any number of other types of products, especially, but not limited to where a device is comprised of a plurality of different component parts which may be component parts from different manufacturers.

Figure 1:
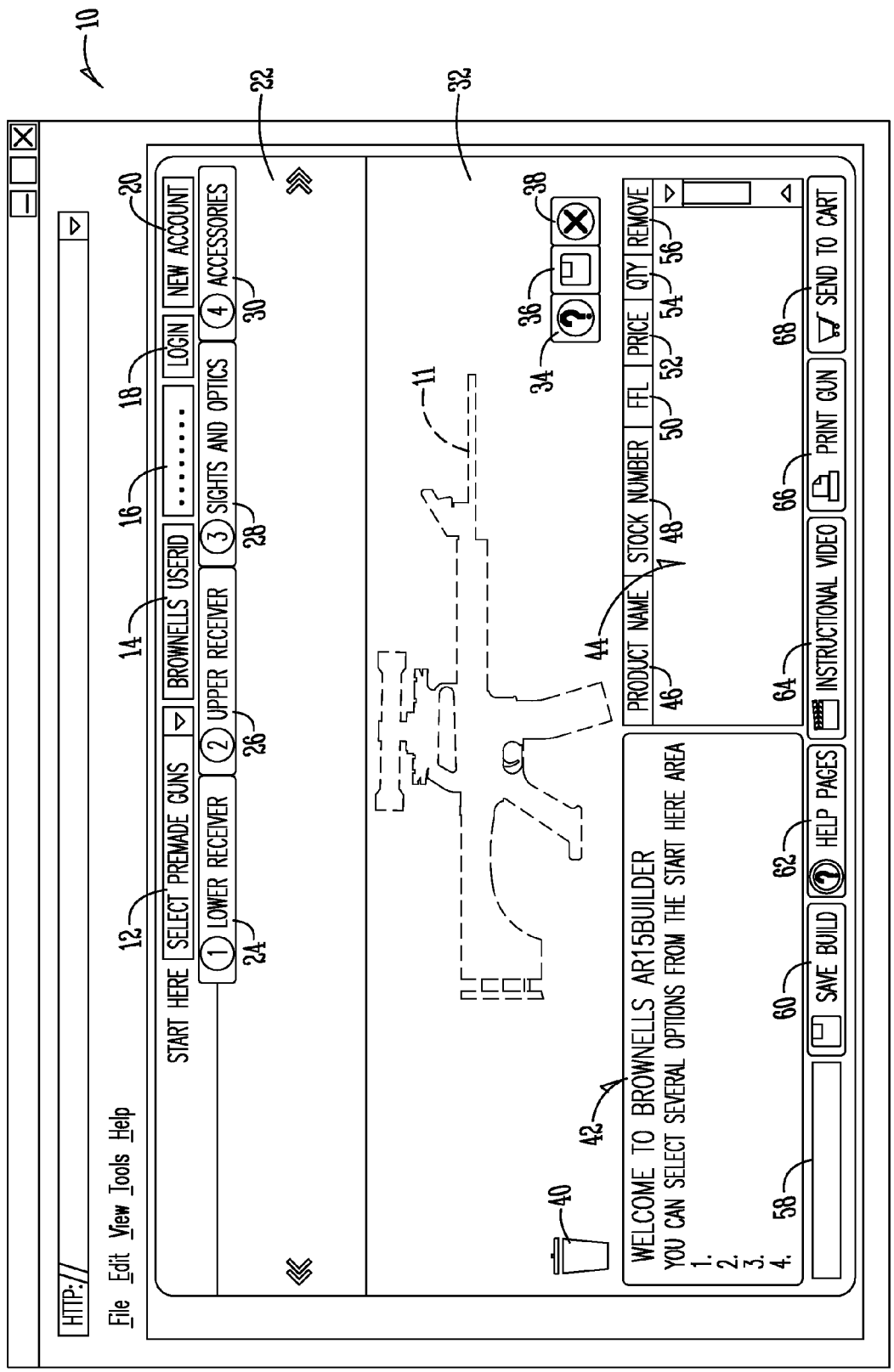
FIG. 1 is a representation of a screen display for building a gun.

FIG. 1 shows a screen display 10 for building a gun, and in particular an AR-15. An outline or blurred background image 11 of an AR-15 is shown. Although an AR-15 is shown, the present invention contemplates any number of other products may be built in a similar manner including other types of firearms, other types of sporting goods or other types of products. Near the top of the screen display 10, a drop-down list box 12 is shown. If a user selects the drop-down list box 12, the user may select from one or more pre-made guns to start with. The available pre-made gun selections may be available to all users, users within a specific group, or to individual users. If the user has an account, the user can enter their user name into the user name text box 14 and may enter their password into the text box 16. The user can then select the login button 18 to log into their account. Alternatively, the user can create a new account by selecting the "new account" button 20. Having a user account allows a user to save their build. In addition, a user account provides one way with associating a user with a particular group of users. For example, members of a particular battalion may be presented with particular set of approved options which they may procure for their service weapon. Once a user logs-in the system can determine the premade guns or the component parts or accessories which are to be made available to the user.

A first region 22 of the screen display is shown. Various part selections may be shown in this screen region 22. Note that in FIG. 1, no parts are displayed yet. The screen display 10 also includes a "lower receiver" menu 24, an "upper receiver" menu 26, a "sights and optics" menu 28 and an "accessories" menu 30. In assembling a weapon, a user would typically want to first select a lower receiver, then select an upper receiver, then select sights and optics, and then select accessories.

A region 32 is shown. There is a silhouette, outline or blurred background image 11 of an AR-15 shown in the background of the region 32. The region 32 is where component parts or accessories will be visually assembled by placing images of component parts or accessories proximate one another and in positions registered relative to one another.

A user may select the button 34 to receive help at any time. A user may select the button 36 to save their configuration. Similarly, a user may exit the program by selecting the close button 38. In addition, the user can start over by trashing what they have done so far by selecting the trash button 40.

In region 42, welcome information is shown providing brief instructions to a user with respect to how to build their gun. In region 44, information may be recorded regarding each component part or accessory that a user selects. This may include a product name 46, a stock number 48, a federal firearm license (FFL) number 50, a price 52, a quantity 54, or the option to remove a component part 56. Of course other information may also be included that is associated with a particular component part or the ordering of a particular component part.

A user may enter a name of their build in the text box 58. The user may save their build by selecting the "save build" button 60. The user may select help pages by selecting the "help pages" button 62. The user may select to view educational material such as educational or instructional videos by selecting the "instructional video" button 64. The user may print the component parts associated with the gun they have built by selecting the "print gun" button 66. The user may send the component parts they have selected to an on-line shopping cart by selecting the "send to cart" button 68.

Figure 2:
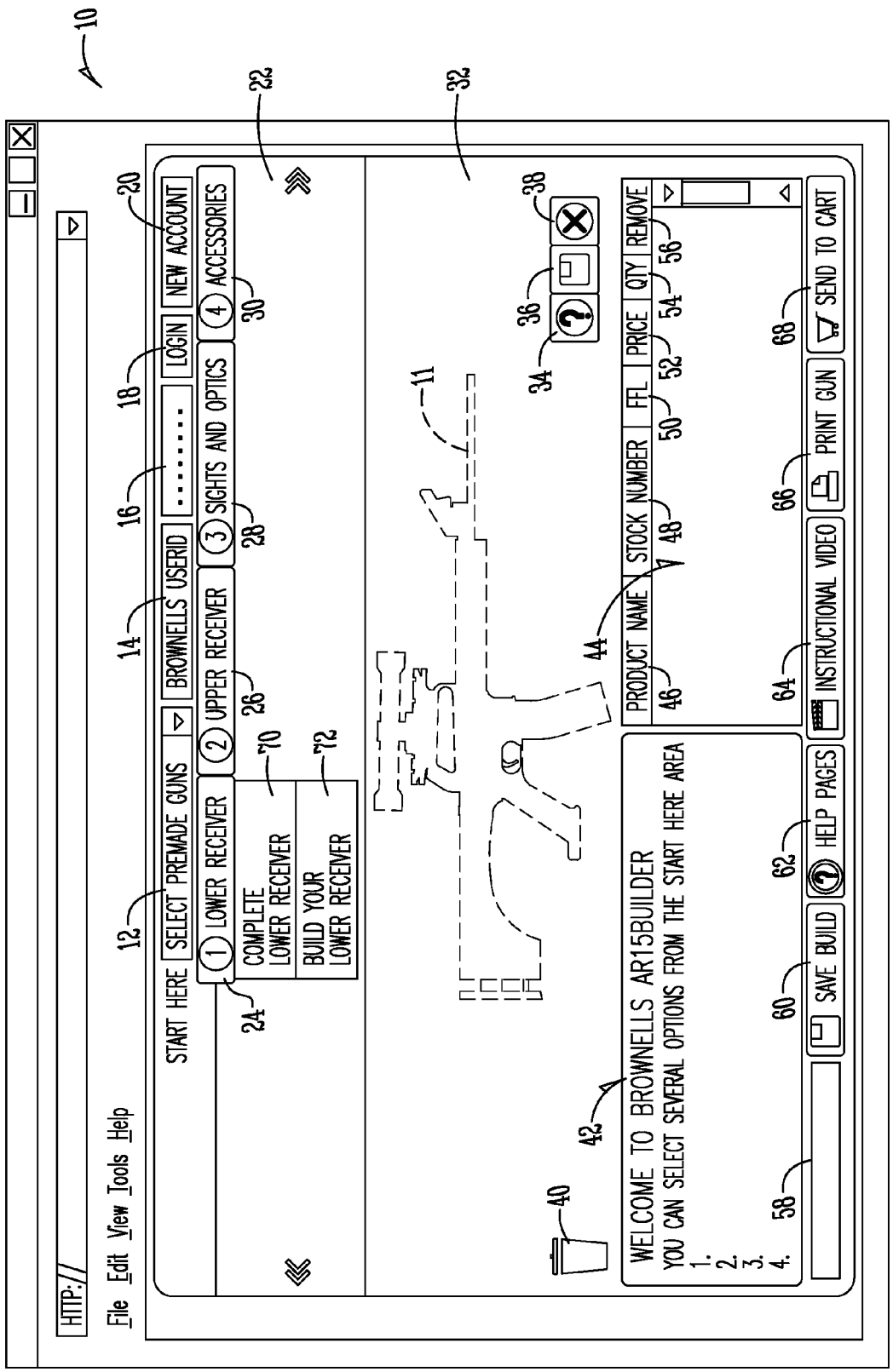
FIG. 2 is a screen display for building a gun showing that a user may select either a complete lower receiver or may build their own lower receiver.

FIG. 2 illustrates that when a user selects the lower receiver menu 24, they may then be presented with different options such as a "complete lower receivers" option 70 or a "build your lower receiver" menu item 72.

Figure 3:
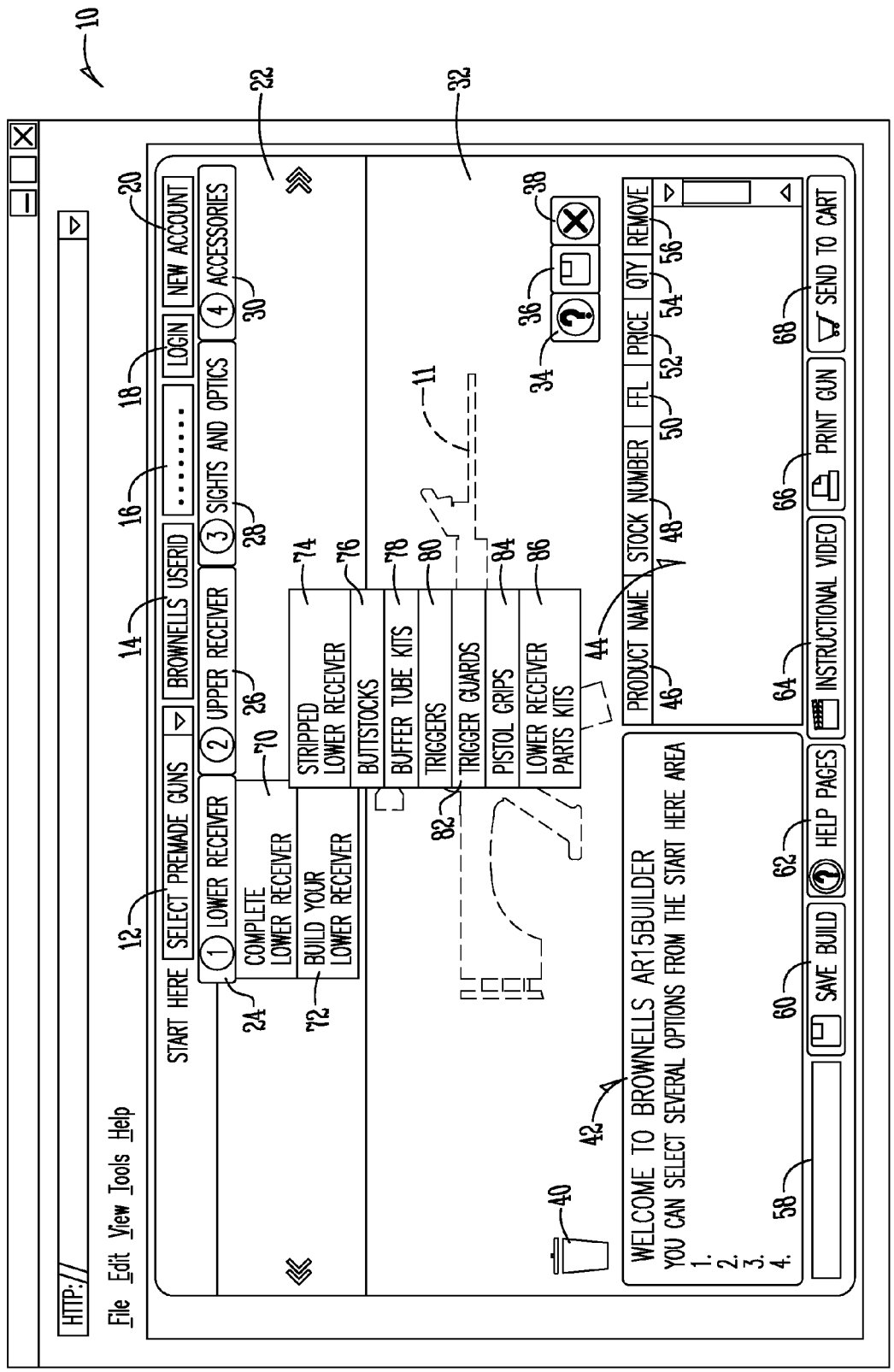
FIG. 3 is a screen display for building a gun showing that when a user selects to build their own lower receiver they may select various types of component parts.

As shown in FIG. 3, if a user selects the "build your lower receiver" menu item 72, the user is then provided additional menu choices such as "stripped lower receivers" 74, butt stock 76, buffer tube kit 78, triggers 80, trigger guards 82, pistol grips 84, or lower receiver parts kit 86.

Figure 4:
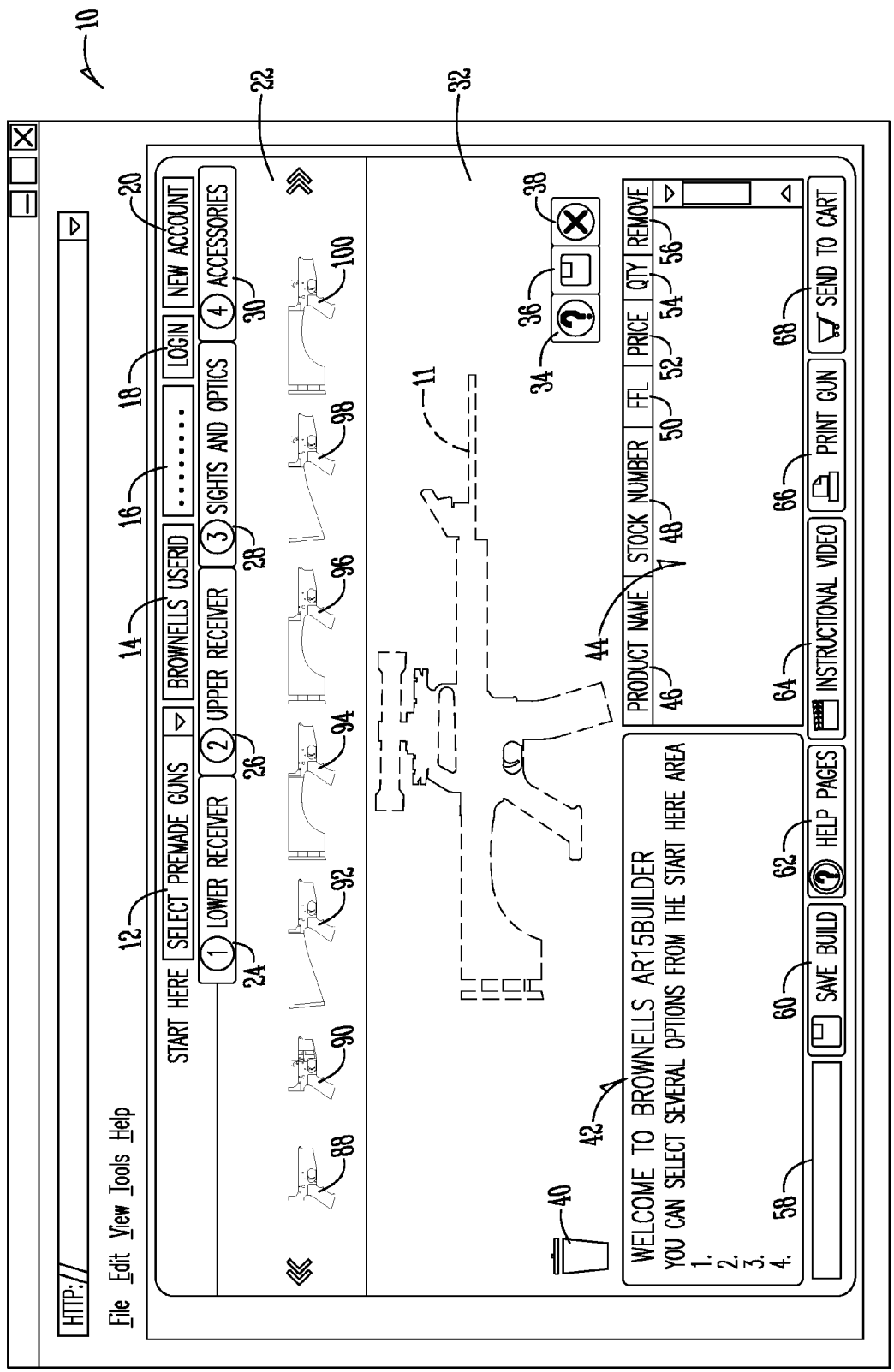
FIG. 4 is a screen display for building a gun showing images of various types of lower receivers that a user may select.

As shown in FIG. 4, if a user selects a complete lower receiver instead of building their own lower receiver, a number of images of lower receivers are presented in the screen area 22. As shown in FIG. 4, a first lower receiver 88 is shown, a second lower receiver 90 is shown, a third lower receiver 92 is shown, a fourth lower receiver 94 is shown, a fifth lower receiver 96 is shown, a sixth lower receiver 98 is shown, and a seventh lower receiver 100 is shown. Thus, a user is presented with images of each of these lower receivers from which they may select. To see additional lower receivers, a user may scroll right or left in the region 22.

Figure 5:
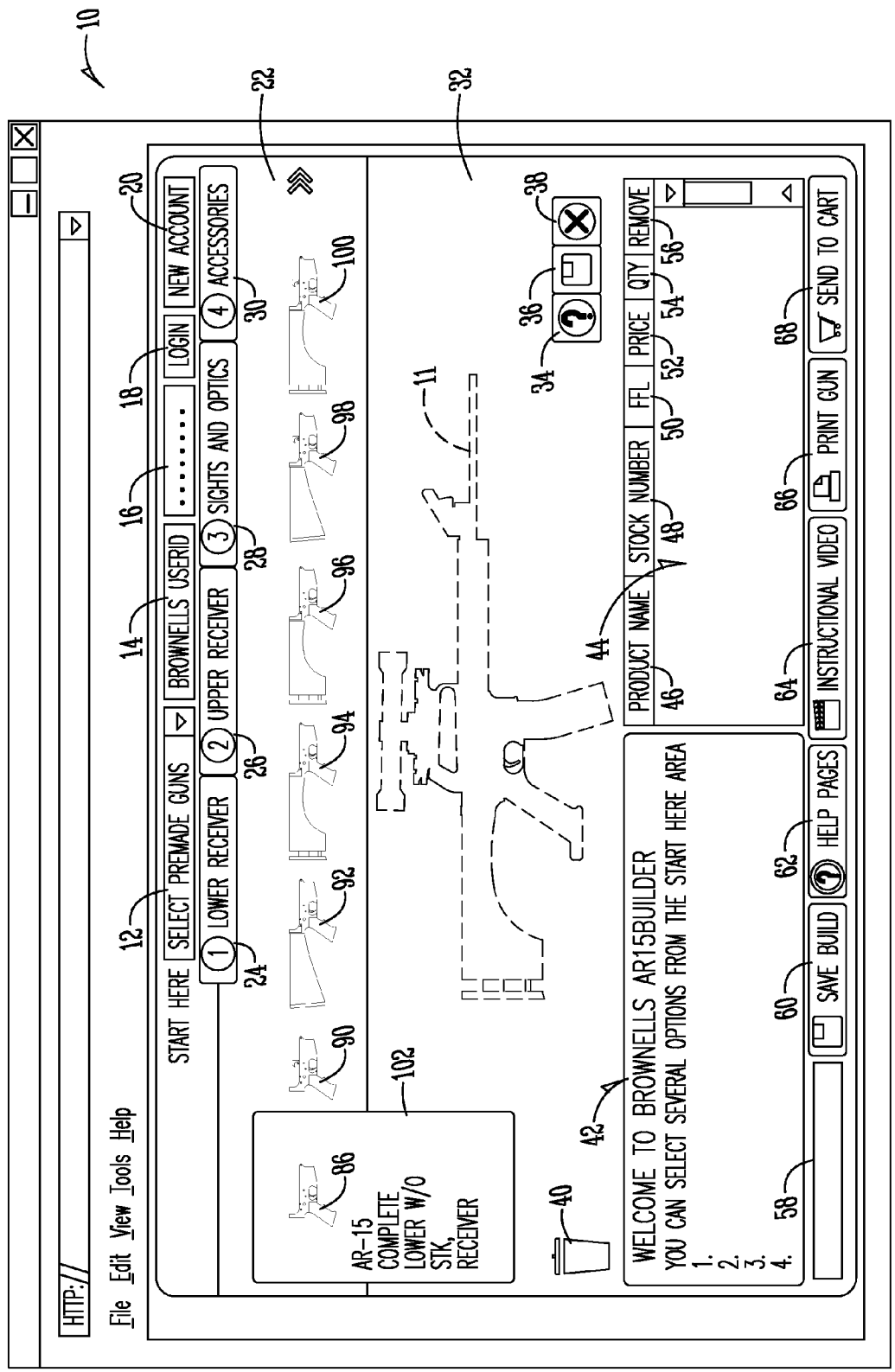
FIG. 5 is a screen display for building a gun showing that a user may obtain additional information about a particular component part by selecting the component part.

As shown in FIG. 5, a user may mouse over the lower receiver 88 and be shown additional information as shown in box 102. This additional information may include a description, part numbers, manufacturers, pricing information, and availability information. Thus, a user can obtain more information about any of the component parts shown in region 22.

Figure 6:
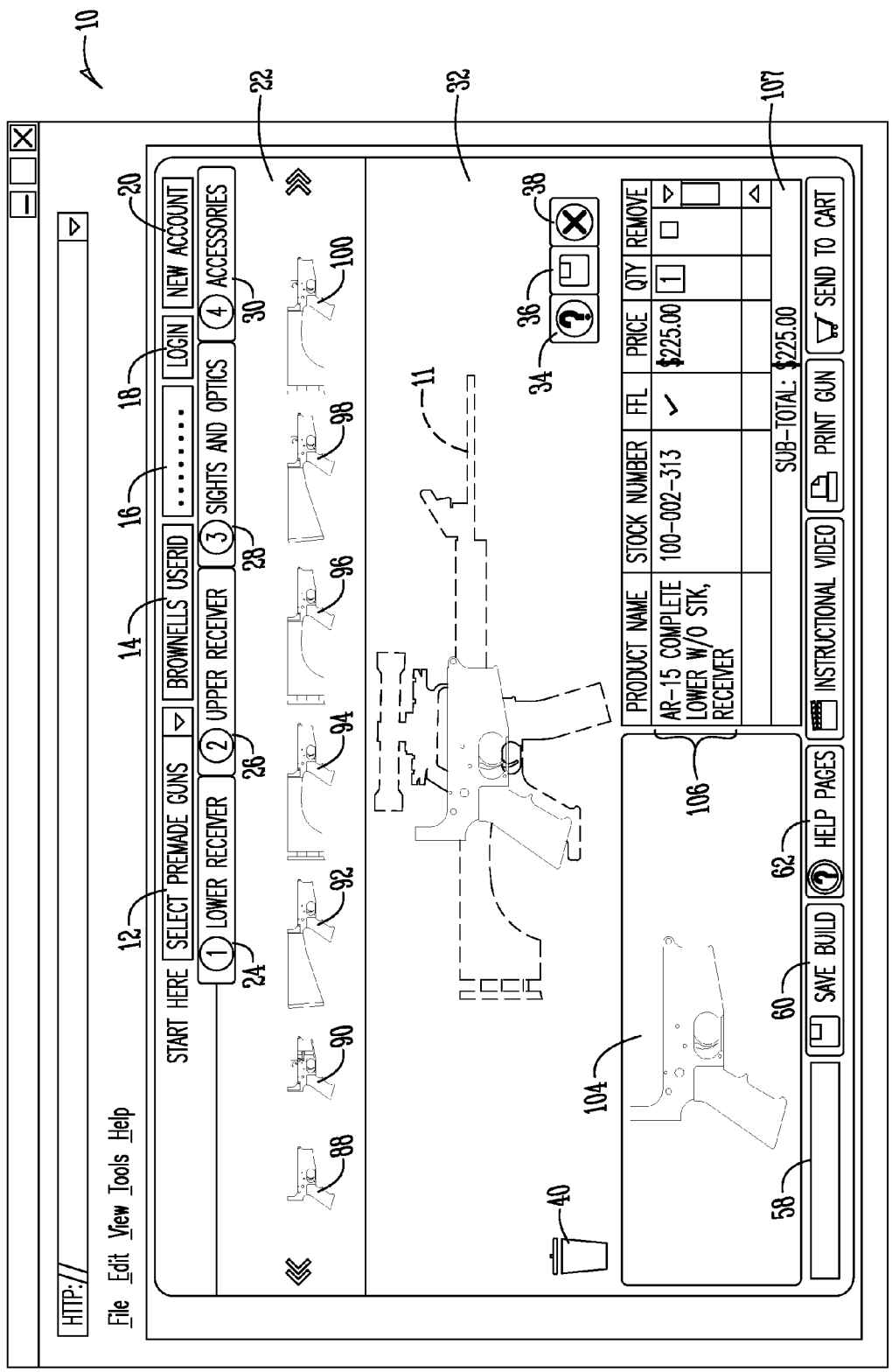
FIG. 6 is a screen display for building a gun showing that when a component part is selected an image of the component part is displayed and the component part is adding to a list of items to potentially purchase.

As shown in FIG. 6, once a user selects a particular lower receiver such as by selecting the lower receiver component part 88 in region 22, an image of the selected component part 102 is shown in the region 22, overlaying the background image 11 of the AR-15. In addition, an image of the selected component part 88 is shown in the region 104. Also, the selected component part is added to the list in region 44. Thus, as shown in FIG. 6, item 106 is added to the list 44. In addition, a sub-total is shown 107.

Figure 7:
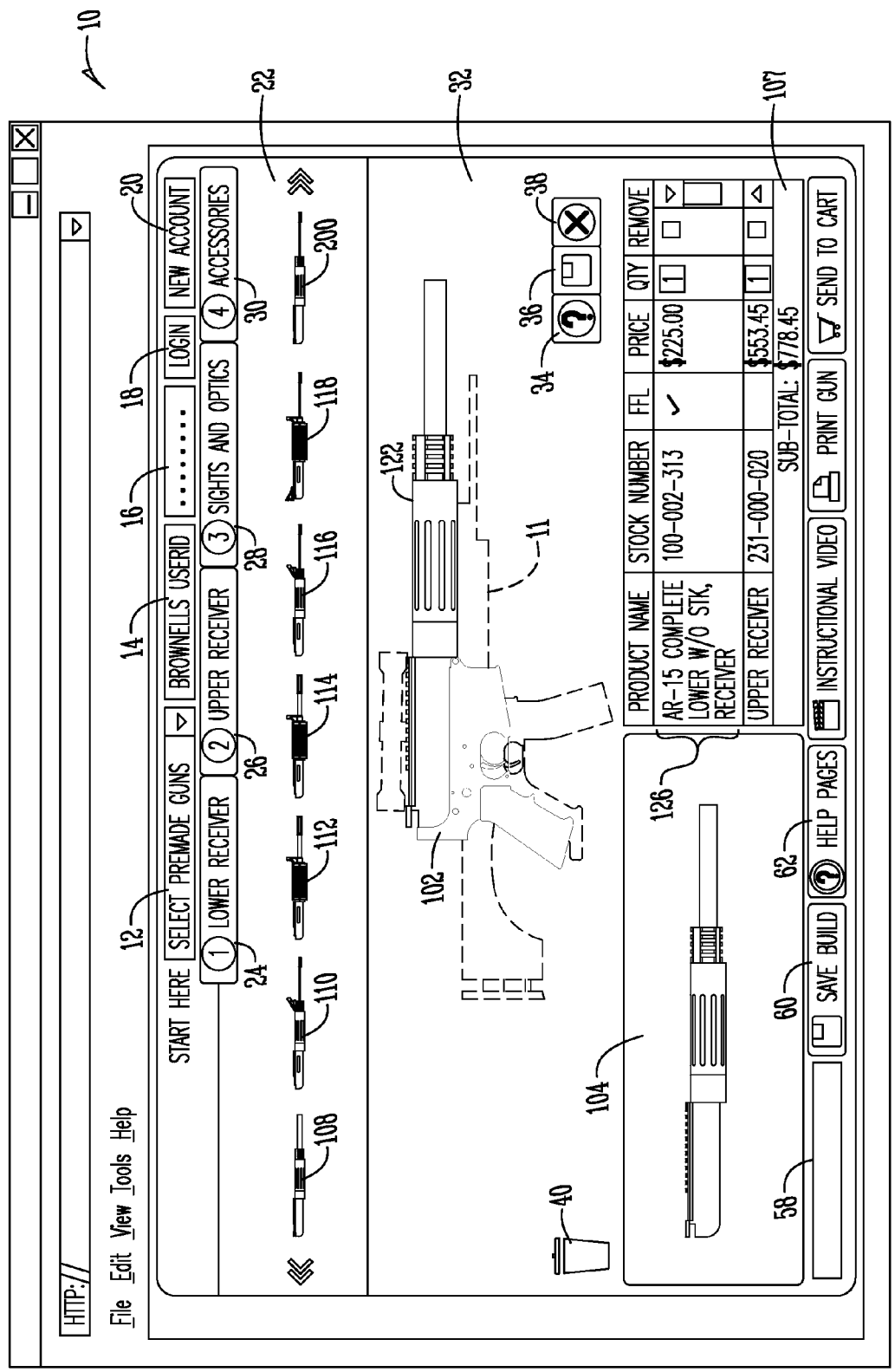
FIG. 7 is a screen display for building a gun showing an upper receiver being selected and an image of the upper receiver being positioned proximate a registered position relative to a lower receiver.

FIG. 7 illustrates that if a user then selects an upper receiver, the user is shown different component parts to select in the region 22. Here a user has selected the component part 108. Thus, a corresponding image is placed in the region 32 as well as in the box 124. In addition, the selected component part is added as a new item 126 in the parts list 44. Note the part is added at the top of the list, although the part could be added at the bottom or elsewhere in the list. Also, the sub-total 107 is updated accordingly.

The list that is built may be saved on the web site. Thus, a customer may design on the web site their current configuration of a gun and then try out new components. Similarly, a customer may build a dream configuration online and then order the parts piece by piece. The ability to save configuration provides a customer with flexibility and convenience in ordering component parts.

Note that the image 122 is placed proximate the image 102 in the region 22. The image 122 is aligned with the image 102 so as to provide a visual representation of an assembled gun with multiple components. Note that instead of rendering a new image which includes a complete assembly, the visual depiction of the assembled gun with multiple component parts or accessories is formed from separate images for each of the selected component parts or accessories. Such an approach is more complex but is advantageous in that it results in quicker load times and is visually more fluid. Note that to construct an assembly from multiple component parts, the images are preferably aligned with one another to provide a seamless assembly. Thus, the images are preferably consistent with each other in terms of lighting, focal distances, and angles. In operation, there may be automatic alignment of photographs.

Figure 8:
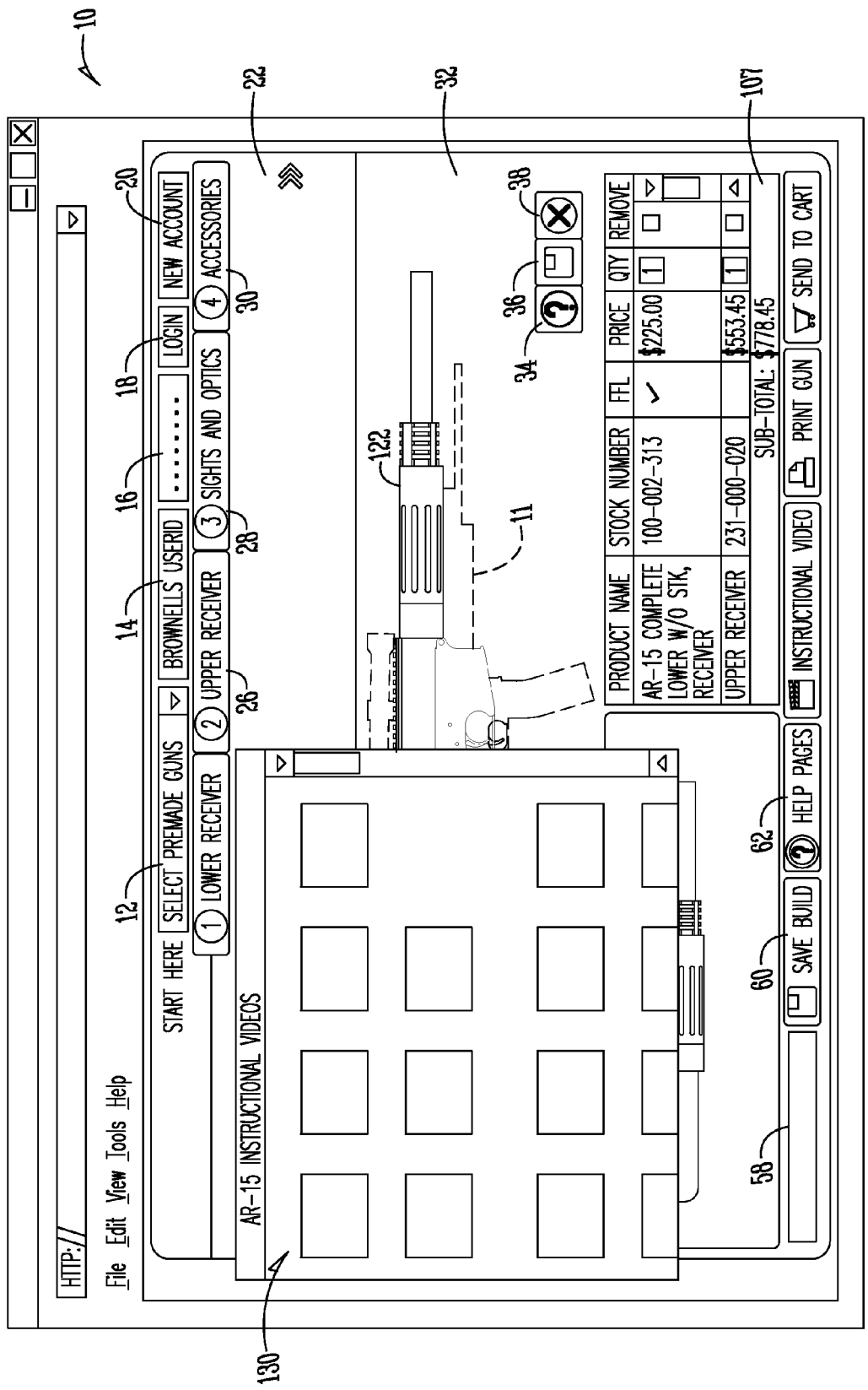
FIG. 8 is a screen display showing educational materials about component parts.

FIG. 8 illustrates a window 130 with multiple instructional videos that a user may select. The instructional videos or other educational information provided to the user may assist the user in making buying decisions. For example, such information may assist the user in learning how to assemble multiple components from different manufacturers. Thus, prior to ordering component parts, a user may visit the website and view educational materials. This, in some cases, may increase the comfort level of a user that they will be able to assemble the component parts or accessories themselves without help. In addition, in some cases, the educational material may assist a user in determining that the component parts they are interested in purchasing would be legal for them to acquire.

It should be appreciated that when a user selects multiple components for assembly that these components may be from different manufacturers. Therefore, it is difficult for a user to be able to visualize what an assembly which includes these multiple component parts may look like without having access to the physical component parts at the same time.

Thus, the present invention provides a method of visually depicting an assembly having multiple component parts, even if the multiple component parts are from different manufacturers. To do so, images of each component part are taken to later be combined together based upon a user's selections of the component parts. It should be appreciated, however, that in order to provide separate images of component parts that can be combined to form an assembly of the component parts introduces an additional level of complexity. To address this level of complexity, images may be acquired of each component part under controlled lighting conditions and by placing the parts in particular locations relative to a camera. This results in a consistent set of images that can be used together, provided that the images are properly registered with respect to each other. The images are then assembled in a snap-to manner so that the images of the component parts line up.

Figure 9:
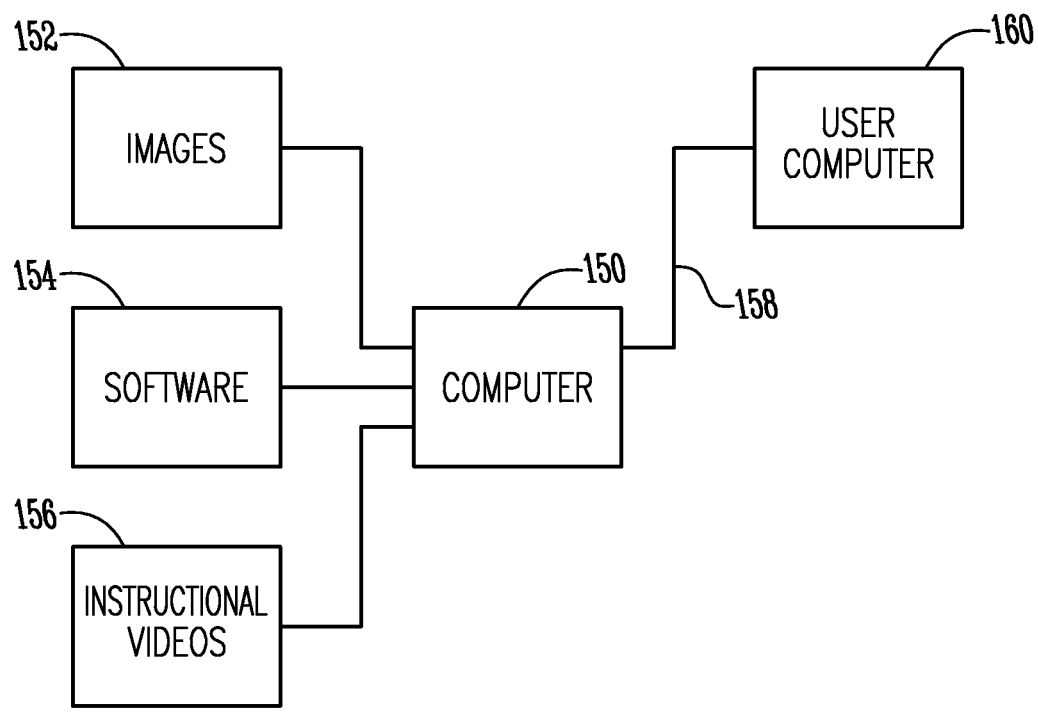
FIG. 9 illustrates a block diagram of a system.

FIG. 9 illustrates one embodiment of a system of the present invention. In FIG. 9, a computer 150 is shown. The computer 150 is operatively connected to a first computer readable medium 152 on which images of component parts and accessories are stored. The computer 150 is also operatively connected to a second computer readable medium 154 on which an article of software is stored which includes instructions for providing the functionality of the described methods. The present invention contemplates that the article of software may be developed using any of a number of different languages or development tools. One example of such a platform is AJAX. The computer 150 is also operatively connected to a computer readable storage medium 156 upon which instructional videos are stored. The present invention contemplates numerous variations regarding how the various storage mediums are accessed by the computer 150. The present invention further contemplates that the various storage mediums may be located on a single physical device or multiple physical devices. The computer 150 is operatively connected over a network 150, such as the internet, to a user computer 160.

It should be understood that the present invention may be used for any number of types of items. Generally, such goods involve component parts or substantial user customization, and in which the user may assembly the item themselves from the component parts (although the present invention contemplates that component parts may be assembled by someone other than the user). For example, the present invention may be used to build a bow, to build a bullet, to build a highly customized vehicle, an engine, or other items.

Therefore, a method and system for online ordering of component parts has been disclosed. It should be appreciated that the method and system assist customers in visualizing component parts from different manufacturers together in an assemblies. Although specific embodiments have been described, the present invention is not to be limited to the specific embodiments described herein.

What is claimed is:

1. A method for selling component parts to a customer over a communications network, the method comprising:
   providing a plurality of component part selections over the communications network;
   receiving a selection of a first component part over the communications network;
   sending a first photographic image for display to the customer and displaying the first image on a display of a computing device, the first photographic image being of the first component part;
   receiving a selection of a second component part;
   after receiving the selection of the second component part, sending a second photographic image for display to the customer and displaying the second image on the display of the computing device, the second photographic image being of the second component part, such that the second photographic image being displayed in a position proximate the first photographic image and registered relative to the first photographic image to visually depict a composite view of a firearm assembly having both the first component part and the second component part;
   receiving and processing an order for at least one of the first component part and the second component part over the communication network using a computer.

2. The method of claim 1 wherein the first component part is from a first manufacturer and the second component part is from a second manufacturer, the first manufacturer being different from the second manufacturer.

3. The method of claim 1 further comprising providing a plurality of accessory selections over the communications network for use with the assembly.

4. The method of claim 3 further comprising receiving a selection of a first accessory over the communications network.

5. The method of claim 4 further comprising sending a third photographic image, the third photographic image being of the first accessory such that the third photographic image being displayed in a position proximate the first photographic image and the second photographic image and registered relative to the first photographic image and the second photographic image.

6. The method of claim 5 wherein the order includes the first accessory.

7. The method of claim 1 wherein the firearm assembly is a rifle assembly.

8. The method of claim 7 wherein the rifle assembly is an AR-15 assembly.

9. The method of claim 1 further comprising generating the first photographic image and the second photographic image by separately imaging the first component part and the second component part under controlled lighting conditions and controlled angles and focal distances to assist in assembly of a seamless visual representation of the assembly when the first photographic image is placed proximate the second photographic image.

10. A method for selling firearm component ports to a customer over the internet, the method comprising:
    providing a plurality of firearm component part selections over the internet, the component part selections being from a plurality of different manufacturers;
    receiving a selection of a first firearm component part over the internet;
    sending a first photographic image for display to the customer and displaying the first photographic image on a display of a computing device, the first photographic image being of the first firearm component part;
    receiving a selection of a second firearm component part;
    after receiving the selection of the second firearm component part, sending a second photographic image for display to the customer over the interact and displays the second image on the display of the computing device, the second photographic image being of the second firearm component part, such that the second photographic image being displayed in a position proximate the first photographic image and registered relative to the first photographic image to visually depict a composite view of an assembly having both the first component part and the second component part;
    receiving and processing, over a computer network an order for at least one of the firearm component part and the second firearm component part.

11. The method of claim 10 further comprising sending to the customer each of the firearm components in the order.

12. The method of claim 10 further comprising providing a plurality of instructional videos to the customer over the interact.

13. The method of claim 12 wherein the instructional videos include instructions for assembling the first component part and the second component part.

* * * * *

UNITED STATES PATENT AND TRADEMARK OFFICE
CERTIFICATE OF CORRECTION

PATENT NO.        : 8,538,832 B2                         Page 1 of 1
APPLICATION NO.   : 12/465220
DATED             : September 17, 2013
INVENTOR(S)       : Peter R. Brownell It is certified that error appears in the above-identified patent and that said Letters Patent is hereby corrected as shown below:

In the Claims
Col. 8, Claim 10, Line 11:
DELETE after component "ports"
ADD after component --parts--

Signed and Sealed this
Tenth Day of December, 2013

Margaret A. Focarino
*Commissioner for Patents of the United States Patent and Trademark Office*